March 3, 1953 G. W. ASHLOCK, JR 2,630,205
FRUIT HANDLING MACHINERY
Filed April 14, 1952 2 SHEETS—SHEET 1
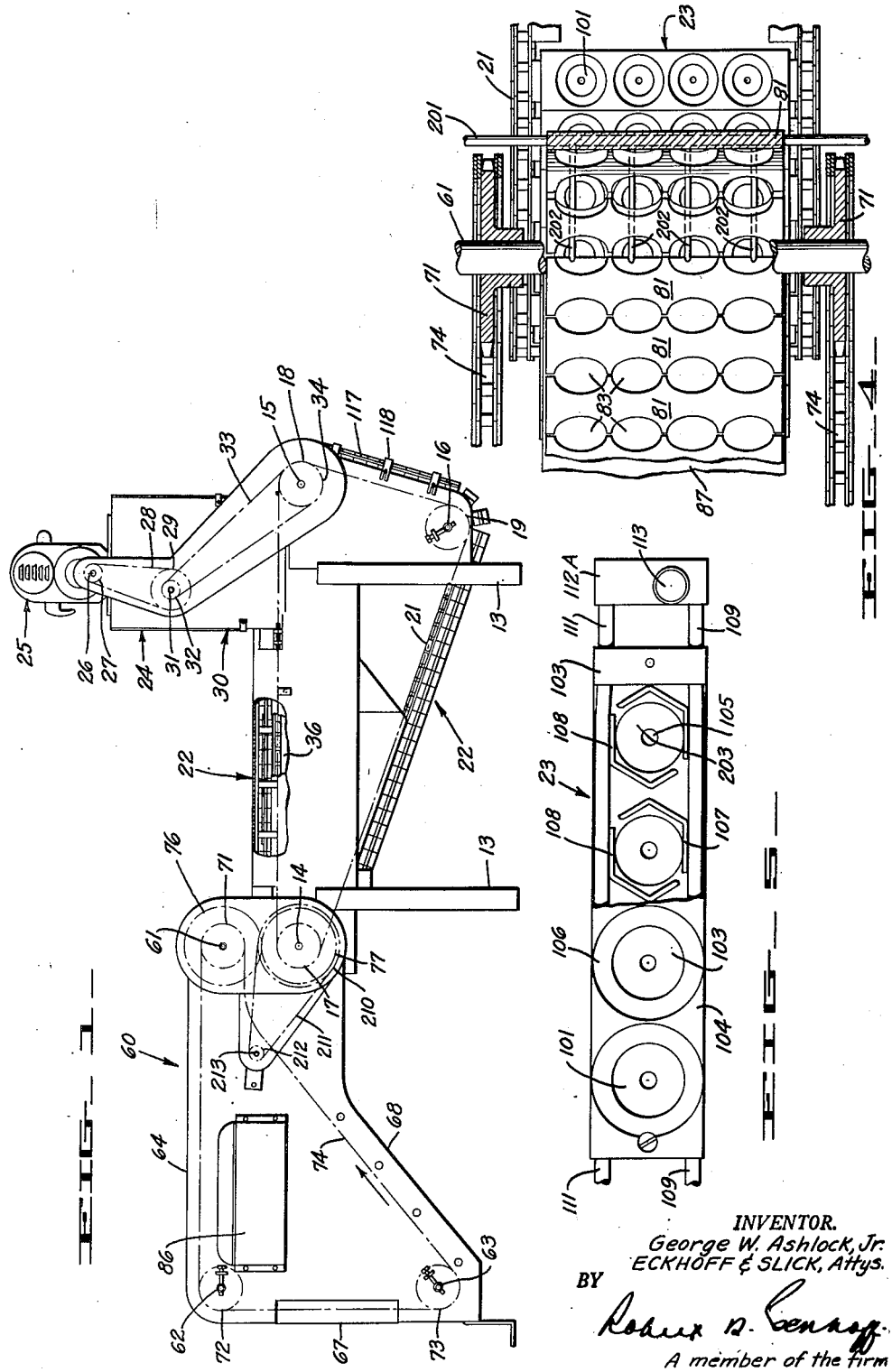
INVENTOR.
George W. Ashlock, Jr.
ECKHOFF & SLICK, Attys.
BY
A member of the firm March 3, 1953 G. W. ASHLOCK, JR 2,630,205
FRUIT HANDLING MACHINERY
Filed April 14, 1952. 2 SHEETS—SHEET 2
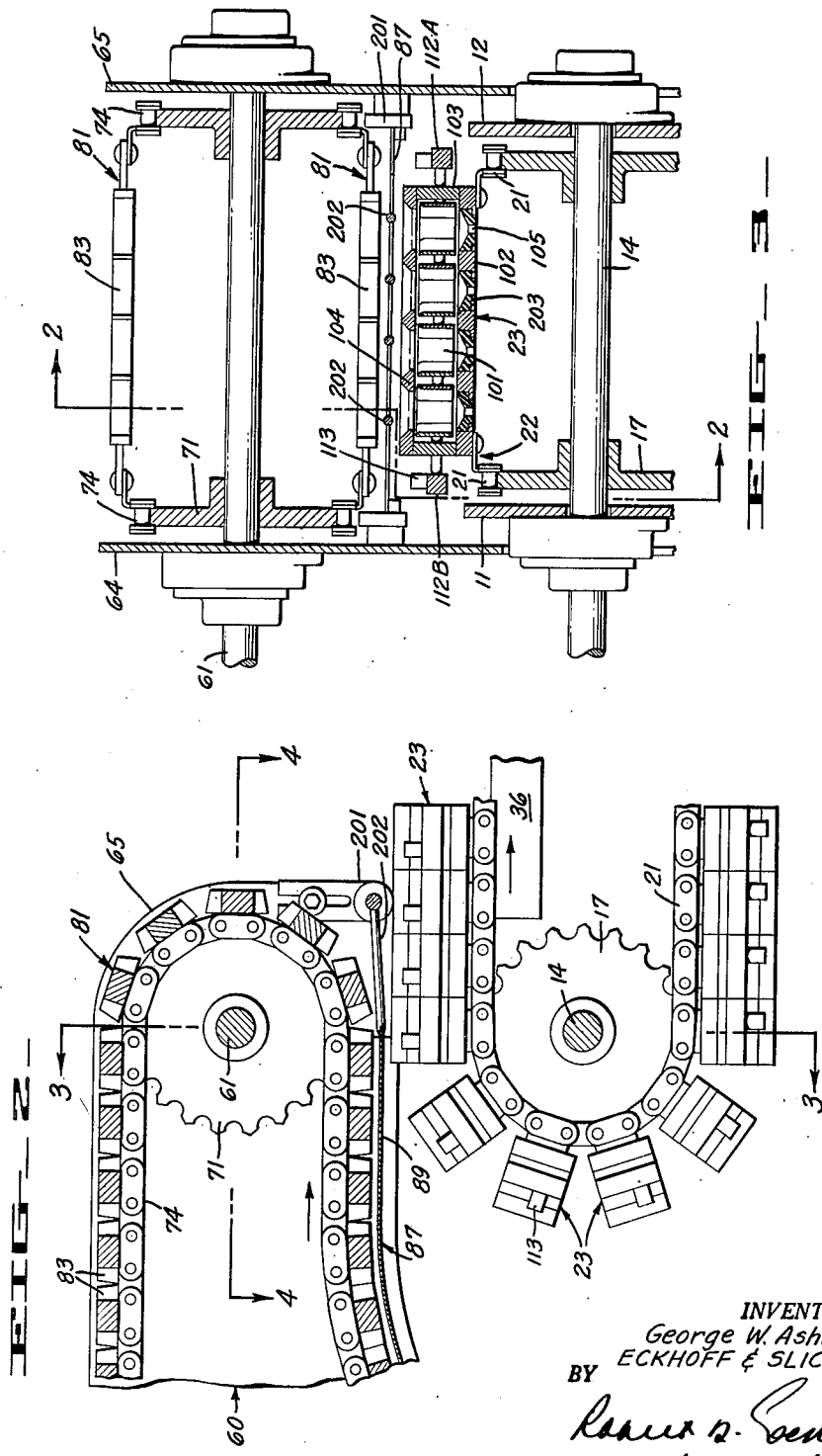
INVENTOR.
George W. Ashlock, Jr.
BY ECKHOFF & SLICK, Attys.
A member of the firm Patented Mar. 3, 1953

2,630,205

UNITED STATES PATENT OFFICE 2,630,205

FRUIT HANDLING MACHINERY

George W. Ashlock, Jr., Oakland, Calif.

Application April 14, 1952, Serial No. 282,117

6 Claims. (Cl. 198—33)

This invention relates to a machine for removing the pits from fruit having a minor axis and a major axis which is substantially greater than the minor axis such as dates, fresh or dried prunes and certain varieties of olives.

Dried dates and prunes present a special problem with respect to removal of the pit or stone because the individual fruits are of an irregular shape and because their high sugar content makes them quite sticky. In addition, it is sometimes advantageous to pit dried prunes while hot and wet so that the problem of alignment for stone removal is made more difficult.

It has been proposed heretofore to support each such fruit along a portion of one side and thereafter force the fruit stone through the supported side portion of the fruit. This has been successful to some extent, but resulted in the tearing of the side of the fruit through which the stone had been ejected; in addition, the stone carried with it such a portion of the fruit meat that considerable loss in weight of the fruit followed.

I have found that the fruit is best handled by positioning the fruit in a fruit holder having an open-ended cavity and placing the fruit in the cavity with the major axis of the fruit aligned with the major axis of the cavity. The surfaces defining the cavity are symmetrically disposed about its major axis and movable toward such axis to retain a fruit during pitting, the surfaces thereafter being moved apart to release the fruit. In this manner, the fruit can be readily positioned in the fruit holder, aligned, the pit removed and the pitted fruit released.

It is in general the broad object of the present invention to provide a novel machine for selecting a fruit such as dates, prunes and the like, from a bulk supply and positioning each fruit in a predetermined position of alignment.

A further object of the present invention is to provide a novel feed mechanism for feeding fruit such as dates, prunes and the like and aligning the fruit with the axis thereof in a predetermined position.

The invention includes other objects and features of advantage, some of which, together with the foregoing, will appear hereinafter wherein the present preferred form of mechanism embodying this invention is disclosed. In the drawing accompanying and forming a part hereof, Figure 1 is a side elevation showing a complete machine embodying the present invention.

Figure 2 is an enlarged view, partly in section, showing the relation between the delivery mechanism and the fruit holder mechanism in which the fruit is oriented prior to a subsequent pitting or stoning operation, the view being along line 2—2 in Figure 3.

Figure 3 is a section taken along the line 3—3 in Figure 2.

Figure 4 is a section taken along the line 4—4 in Figure 2.

Figure 5 is a plan view, partly in section, of a fruit carrier or holder.

Brief description

The machine of the present invention includes a feeding mechanism on which fruit to be pitted is delivered in bulk. The feeding mechanism delivers the fruit one at a time to a transfer station; as a step in the delivery, the feeding mechanism positions each fruit with its major axis extending horizontally and transversely to the direction of movement by the feeding mechanism. At the transfer station, the fruit is turned into a position wherein its major axis is vertical and in which position it is placed in a cavity in a fruit receptacle. The receptacle has movable side walls which are moved in upon the fruit to retain it with its major axis extending parallel to that of the receptacle cavity; preferably the major axis of the cavity extends vertically at the transfer station. Thereafter, the aligned fruit is pitted at a pitting station, the fruit stone being forced from one end of the fruit through the other end of the fruit. The fruit is then released, the receptacle side-walls being moved apart at a discharge station. The several components of the preferred embodiment of the machine will now be described.

The frame and general drive mechanism

Referring to the drawing, the machine includes a frame made up of spaced side plates 11 and 12 supported in a parallel spaced relation and having legs 13 thereon. Shafts 14, 15 and 16 are mounted at opposite corners of the frame, the shafts respectively having pairs of sprockets 17, 18 and 19 thereon about which chains 21 are trained to provide a main fruit conveyor, generally indicated at 22, the upper run of which is supported by guide rails 36 provided along the inside of each of plates 11 and 12. Fruit holders, generally indicated as 23, are extended transversely between the chains 21. A sub-frame 24 is mounted upon side plates 11 and 12 and an electric motor-speed reducer unit, generally indicated at 25, is mounted thereon to drive suitable pitting mechanism generally indicated at 30 and which is more particularly shown in my Patents 2,157,518 and 2,219,832; the prime mover includes a shaft 26 having a sprocket 27 thereon driving a chain 28, this in turn being passed about a sprocket 29 on a shaft 31 in the pitting mechanism (corresponding to shaft 39 in the aforesaid patents). Also mounted on shaft 31 is a sprocket 32, chain 33 being trained about this and about a sprocket 34 on shaft 15 to drive the main fruit conveyor 21 in a timed relation with the pitting mechanism 30.

The feed conveyor

The feed conveyor 60 includes spaced shafts 61, 62 and 63 mounted at spaced corners on frame plates 64 and 65 which are, in turn, supported on the frame of the machine. An end wall 67, a side wall 68 and a bottom skid plate 87 are provided and, with an interior hopper structure provide a bin-like structure. Each of plates 64 and 65 includes openings 66 therein through which bulk fruit is introduced. Each of shafts 61, 62 and 63 includes sprocket pairs 71, 72 and 73 at each end supporting chains 74, shaft 61 being driven by a gear 76 meshing with a gear 77 on shaft 14. Extended transversely between the chains 74 are a plurality of fruit carriers generally indicated at 81 comprising longitudinal strip members extended between each of the chains 74.

Each of the carriers 81 includes an indent or recess 83 along an edge, the indent being closed by a like indent or recess in the opposite edge of the immediately adjacent carrier 81 to provide a complete enclosure for a fruit when adjacent carriers are in edge-to-edge engagement and in the same plane. In the form shown, each carrier member leading edge and trailing edge is provided with a recess, the adjacent recesses cooperating to provide a complete receptacle or carrier. Each receptacle 83 in the fruit holders 81 is of a suitable configuration, preferably conoidal, as is shown in Figure 4 and in my application Serial Number 215,799 filed March 15, 1951, to admit readily the elongated fruit such as dates and prunes; the receptacles can be provided completely as a recess in an edge of one carrier member being completed by the adjacent edge of the next adjacent carrier member.

The chains 74 are movable over a path in which they ride over the bottom supporting plate or skid plate 87 provided between the plates 64 and 65, a fruit falling into one of the receptacles on the carriers and being rolled along the skid plate into a position in which its major axis is horizontal and normal to its advance. A brush (not shown) is positioned transversely between the plates to sweep back fruit which is not within a receptacle between adjacent carriers; the brush shaft 213 is driven from shaft 14, sprocket 210 thereon driving a chain 211 extended about a sprocket 212 on brush shaft 213. If desired, a vibrator can be attached to the skid plate in that region wherein the conveyor moves from sprocket 73 to sprocket 71 to vibrate the skid plate and assist fruit engaging the conveyor for movement.

The supporting plate 87 includes a horizontal portion 89 from whence the feed conveyor 60 passes upwardly about sprockets 71. Sprockets 71 are provided immediately adjacent and cooperatively with respect to sprocket 17 whereby, as the fruit carriers 81 pass about sprockets 71, they move apart, as is illustrated in Figure 2, and the fruit therein is released from the support of the skid plate to drop into a cooperatively positioned fruit holder 23 on conveyor 21, the two conveyors being moved in a timed relation to effect a timed feeding and filling of each of the cavities in the carrier 21.

In accordance with this invention, each fruit is turned as it leaves the skid plate 87 from a position wherein its major axis is horizontal into a position wherein its major axis is vertical. To accomplish this a bracket 201 is adjustably extended between plates 64 and 65 and in advance of the skid plate 87. A rod 202 is extended between the skid plate and the bracket in a position wherein the rod is adjacent one end of a fruit receptacle 83 so that fruit advanced off the skid plate 87 is momentarily supported at only one end and thereby caused to fall end-foremost into a cavity in a receptacle in a fruit holder 23. When a plurality of receptacles 83 are employed on each fruit holder 81, the outer rods 202 are respectively positioned, as is shown in Figure 3, to cause the fruit to fall in toward the center of conveyor 21 rather than toward the edge thereof.

The fruit holders

The fruit holders 23 can include one or more cavities 101 for receiving fruit. In the machine shown, four cavities are provided across conveyors 22 and 60, but more or less can be provided, as desired. Each holder 23 includes a base plate 102 secured between the conveyor chains 21 and having ends 103 secured thereto. Centrally of each cavity 101 is mounted a rubber stone ejector 203, this being in the form of an annular rubber plug fitting in the base plate and having a central aperture 105. A guide plate 104 is mounted between the ends 103, the guide plate having an inwardly tapered opening 106 over each cavity. The cavity side walls are defined by members 107 and 108 mounted cooperatively opposite one another to provide a cavity of variable size. Members 107 and 108 are mounted respectively on rods 109 and 111 which extend beyond ends 103 to roller carriers 112A and 112B, each having a roller 113 thereon. Roller carrier 112A is secured to rod 109 and is slidable on rod 111, while roller carrier 112B is secured to rod 111 and is slidable on rod 109.

Cam tracks 116 are supported on each side of sub-frame 24 at the pitting station, as is shown in my copending application filed on even date. The tracks 116 are positioned on opposite sides of the conveyor run to engage the face of each of rollers 113 and move the cavity defining members 107 and 108 together upon the fruit confined between the faces defining each cavity.

Cam tracks 117 are provided adjacent the run of the conveyor between sprockets 15 and 16 and wherein the conveyor moves downwardly. The tracks are supported by brackets 118 over the conveyor to engage the inner faces on each roller 113 and move the cavity defining members 107 and 108 apart and so release the pitted fruit.

The cavity defining members 107 and 108 are shown as including straight side walls so that when the fruit is confined between them, the major axis of the fruit is parallel to that of the cavity. In the drawing the cavity defining members are shown as semi-hexagonal in plan, but one can use other shapes, e. g., semi-cylindrical, or any straight side polygonal figure. If desired, the sides of members 107 and 108 need not be continuous; members 107 and 108 can be cut away along their free edges to permit one

Operation

In operation, the feed conveyor and the pitting conveyor move continuously in a timed relation. The fruit is fed in bulk into the feed hopper from whence it is picked up and delivered to the pitting conveyor in a position wherein its major axis is aligned with that of its supporting cavity. The wall surfaces of the receptacle defining the supporting cavity are then closed upon the fruit as it moves toward the pitting station. At the pitting station, the fruit stone is engaged and the stone is moved axially through the fruit to emerge through an end of the fruit. The release of the fruit stone through a small, narrow aperture in one end of the fruit results in a minimum of flesh loss and the fruit appears undamaged and uncut when examined and the flesh is not exposed. Subsequently, the pitted fruit is released from the conveyor which returns for another operation.

I claim:

1. In a machine of the class described, fruit receiving means for holding a supply of fruit, a conveyor movable through said fruit supply and including a plurality of strip members movable through said fruit receiving means, each strip member having a recess along an edge thereof cooperatively positioned with respect to an adjacent edge on the next adjacent strip member to provide a fruit holder, a skid member for supporting a fruit in a recess, means for moving said conveyor over a path including a first portion parallel to the skid member and a second portion commencing adjacent a terminal end of said skid plate and diverging upwardly and away from first portion and wherein immediately adjacent strip members separate to release a fruit confined in a recess between the adjacent strip members for a gravital fall, a second conveyor movable over a path including a first path portion extending horizontally cooperatively adjacent said skid plate terminal end, said second conveyor having a series of receptacles each providing a vertically extending cavity when said conveyor is traversing said first path to receive a fruit falling gravitally from the first conveyor, and means extending from the skid-plate and over said first path portion to turn a fruit through 90° before the fruit is at rest in a receptacle.

2. In a machine of the class described, fruit receiving means for holding a supply of fruit, a conveyor movable through said fruit supply and including a plurality of strip members each having a leading and a trailing edge and movable through said fruit receiving means, each strip member having a recess along its leading edge cooperatively positioned with respect to a like recess in an adjacent edge on the next adjacent strip member to provide a fruit holder, a skid member for supporting a fruit in a recess, means for moving said conveyor over a path including a first portion parallel to the skid member and a second portion commencing adjacent a terminal end of said skid plate and diverging upwardly and away from first portion and wherein adjacent strip members separate to release a fruit confined in a recess between the adjacent strip members for a gravital fall, a second conveyor movable over a path including a first portion cooperatively adjacent said skid plate terminal end to receive a fruit falling gravitally from the first conveyor, and means for turning a fruit through 90° during its traverse from the first to the second conveyor.

3. In a machine of the class described, fruit receiving means for holding a supply of fruit, a first conveyor movable through said fruit supply and including a pair of spaced chains having a plurality of strip members extended therebetween and movable through said fruit receiving means, each strip member having a recess along an edge thereof cooperatively positioned with respect to an adjacent edge on the next adjacent strip to provide a fruit holder, a skid member for supporting a fruit in a recess, means for moving said first conveyor over a path including a pair of sprockets engaged with said chains and positioned adjacent a terminal end of said skid plate and diverging upwardly and away from said skid plate to cause adjacent strip members to separate and release a fruit confined in a recess between the adjacent strip members for a gravital fall, a second conveyor movable over a path including a first portion cooperatively adjacent said skid plate terminal end, said second conveyor including a row of fruit holders, means for moving said conveyors in a timed relationship to position each holder in said row successively in position to receive fruit falling gravitally from the first conveyor, and a rod member extending forwardly from the skid member and in alignment substantially with a terminal end of a fruit holder to provide support for only one end of a fruit as it passes off the skid member.

4. In a machine of the class described, fruit receiving means for holding a supply of fruit, a first conveyor movable through said fruit supply and including a plurality of strip members movable through said fruit receiving means, each strip member having a recess along an edge thereof cooperatively positioned with respect to an adjacent edge on the next adjacent strip member to provide a fruit holder, a skid member for supporting a fruit in a recess with the longitudinal axis of the fruit substantially horizontal, means for moving said first conveyor over a path including a first portion parallel to the skid member and a second portion commencing adjacent a terminal end of said skid plate and diverging upwardly and away from first portion and wherein immediately adjacent strip members separate to release a fruit confined in a recess between the immediately adjacent strip members for a gravital fall, a second conveyor movable over a path including a first path portion extending horizontally cooperatively adjacent said skid plate terminal end, said second conveyor including a row of fruit holders each having a major cavity axis extending vertically in said first path portion, means for moving said conveyors in a timed relationship to position each holder successively in position to receive a fruit released and falling from the first conveyor, and a fruit support member extending beyond said skid member to support only one end of a horizontally extending fruit as it passes off said skid plate and falls onto the second conveyor.

5. In a machine of the class described, fruit receiving means for holding a supply of fruit, a first conveyor movable through said fruit supply and including a plurality of members movable through said fruit receiving means, and providing a series of recesses each providing a fruit holder, a skid member for supporting a fruit in a recess, means for moving said first conveyor over a path including a first portion parallel to the skid member and a second portion commencing adjacent a terminal end of said skid plate and diverging away from first portion to release a fruit confined in a recess for a gravital fall, a second conveyor movable over a path including a first portion cooperatively adjacent said skid plate terminal end to receive a fruit falling gravitally from the first conveyor, and a support member engaging one end of a fruit falling gravitally from the first conveyor to turn the falling fruit through 90°.

6. In a machine of the class described, fruit receiving means for holding a supply of fruit, a first conveyor movable through said fruit supply and including a plurality of members movable through said fruit receiving means, and providing a series of recesses each providing a fruit holder, a skid member for supporting a fruit in a recess, means for moving said first conveyor over a path including a first portion parallel to the skid member and a second portion commencing adjacent a terminal end of said skid plate and diverging away from first portion to release a fruit confined in a recess for a gravital fall, a second conveyor movable over a path including a first portion cooperatively adjacent said skid plate terminal end to receive a fruit falling gravitally from the first conveyor, and a rod member extending from the skid member in the direction of movement of the second conveyor over said first path portion to support only one end of a fruit as said fruit moves in said direction and away from said skid plate.

GEORGE W. ASHLOCK, Jr.

REFERENCES CITED

The following references are of record in the file of this patent:

UNITED STATES PATENTS

| Number | Name | Date |
|---|---|---|
| 935,848 | Jenkins | Oct. 5, 1909 |
| 2,308,038 | Ashlock | Jan. 12, 1943 |
| 2,599,932 | Murphy | June 10, 1952 |